United States Patent [19]

Campo

[11] Patent Number: 5,011,192

[45] Date of Patent: Apr. 30, 1991

[54] BOLT RETAINING HYDRAULIC END FITTING ASSEMBLY

[75] Inventor: Juan M. Campo, Bloomfield Hills, Mich.

[73] Assignee: Michigan Brake Manufacturing, Inc., Troy, Mich.

[21] Appl. No.: 451,867

[22] Filed: Dec. 18, 1989

[51] Int. Cl.⁵ ............................................. F16L 55/00
[52] U.S. Cl. .................................... 285/23; 285/190; 285/328
[58] Field of Search ................. 285/190, 328, 917, 89, 285/23; 411/361, 533, 915

[56] References Cited

U.S. PATENT DOCUMENTS

| | | | |
|---|---|---|---|
| 2,050,137 | 12/1933 | Walsh | 285/328 X |
| 3,384,394 | 5/1968 | O'Connor | 285/190 |
| 3,670,618 | 6/1972 | Jellison | 411/915 X |

Primary Examiner—Randolph A. Reese
Assistant Examiner—Heather Chun
Attorney, Agent, or Firm—Reising, Ethington, Barnard, Perry & Milton

[57] ABSTRACT

A hydraulic end fitting of the type including a bolt for securing the fitting to a hydraulically actuated device such as a brake caliper and including a circular washer having a symmetrically deformed inner circumference to retain the bolt to the fitting until the bolt is secured to the device.

6 Claims, 3 Drawing Sheets

BOLT RETAINING HYDRAULIC END FITTING ASSEMBLY

TECHNICAL FIELD

The present invention relates to hydraulic end fittings of the type used with vehicle braking systems wherein it is necessary to transmit hydraulic pressure from a central brake actuated system to a vehicle brake. In a typical automotive braking system, a brake actuated master cylinder is suitably mounted on the vehicle body or chassis and from which master cylinder a plurality of hydraulic lines are connected to distribute hydraulic pressure to the various brake actuating mechanisms. Since the vehicle wheels move vertically and rotationally relative to the vehicle chassis or body, it is necessary to connect the wheel mounted brake mechanism to the vehicle body mounted hydraulic supply lines through a conduit assembly including a flexible hose portion. The end of the flexible hose assembly adapted to be connected to the wheel-located brake caliper includes a so-called banjo end fitting adapted to be suitably bolted to the caliper. To facilitate the connecting of the banjo fitting to the brake caliper, it is necessary to loosely retain the bolt to the fitting until such time as the bolt is threaded into the caliper housing to complete the mounting connection.

Ultimately, such banjo fittings must provide a sealed hydraulic connection adapted to withstand braking generated hydraulic pressures without leaking. To this end, it has been the practice to provide parallel opposite faces of the hydraulic fitting having serrated surfaces formed by concentric rings surrounding a central passage through the fitting and with which nut and bolt-retained washers are adapted to coact to provide abuttingly engaged surfaces able to seal the fitting without leakage of hydraulic fluid at the minimum pressure bolt tightening pressure specified by the vehicle manufacturer.

The present invention is directed to a way of retaining one of said washers upon the bolt until such time in the assembly operation as the bolt is threaded into the brake calipers flow bolt hole and the washer coacts with the banjo fitting to provide an improved hydraulic seal.

BACKGROUND ART

In prior art hydraulic end fittings it has been the practice to loosely retain the bolt upon the end fitting by distorting or ovalizing an otherwise circular washer so as to create an interference engagement between the washer and the bolt threads at generally two diametrically opposite areas to thereby loosely hold the bolt to the fitting until such time as the bolt can be permanently connected to the brake caliper housing. The problem with such a crimping or ovalizing of the washer is that it diminishes the washer's ability to provide the maximum hydraulic seal between the fitting and the bolt retaining nut. It is the purpose of the subject invention to form the washer in a way as to retain the bolt upon the end fitting without ovalizing the washer.

DISCLOSURE OF THE INVENTION

In the present invention, the brake caliper mounted end fitting includes a pair of parallel and spaced faces and a central hydraulic passage opening into said faces. Each of said faces includes a plurality of V-shaped grooves or annular serrations concentrically disposed about the central passage and which grooves provide a serrated cross section. A transverse passage is formed in said fitting and communicates at one end with said central passageway and is connected at its other end to a rigid conduit which, in turn, is supplied with fluid under pressure from a flexible hose connection leading from the master cylinder. A fitting-retaining bolt extends through said central fitting opening and includes a central portion of reduced diameter which allows fluid under pressure to enter the central passage of the fitting. A longitudinal passage extends from the threaded end of the bolt to a passage which extends transversely of the bolt shank to communicate with the reduced portion of the bolt shank whereby fluid under pressure may flow through the end fitting and bolt to the brake caliper. It is imperative, however, that fluid under pressure not leak out the parallel faces of the fitting with which the nut and bolt coact to mount the fitting on the wheel brake caliper at the minimum torque pressure specified by the vehicle manufacturer.

To prevent such leakage, a first washer is disposed between the bolt head and first face of the end fitting while a second washer is disposed between the second parallel face and is adapted ultimately to be retained by the caliper housing. The washers are made of a material, such as copper, which is softer than the end fitting material which may be formed of a harder material such as steel or brass. When the bolt is threaded into the caliper housing and tightened, the washers are impressed into the fitting serrations to thereby provide a seal between the fitting and the bolt to prevent leakage of fluid under pressure between the bolt and the fitting.

To maximize the radial extent of the contact between the washers and the concentric serrations, it is necessary to maintain the circularity of said washers. There is no problem with the washer disposed between the bolt head and the fitting since there is no need to ovalize or otherwise deform such washer. In the present invention, ovalizing the other washer is also avoided as the means for loosely retaining the bolt on the end fitting. In the present invention, the bolt-retaining washer is circularly and radially inwardly deformed around its entire internal diameter to circumferentially interengage the bolt threads to loosely mount the bolt to the end fitting.

BEST MODE FOR CARRYING OUT THE INVENTION

Figure 1:
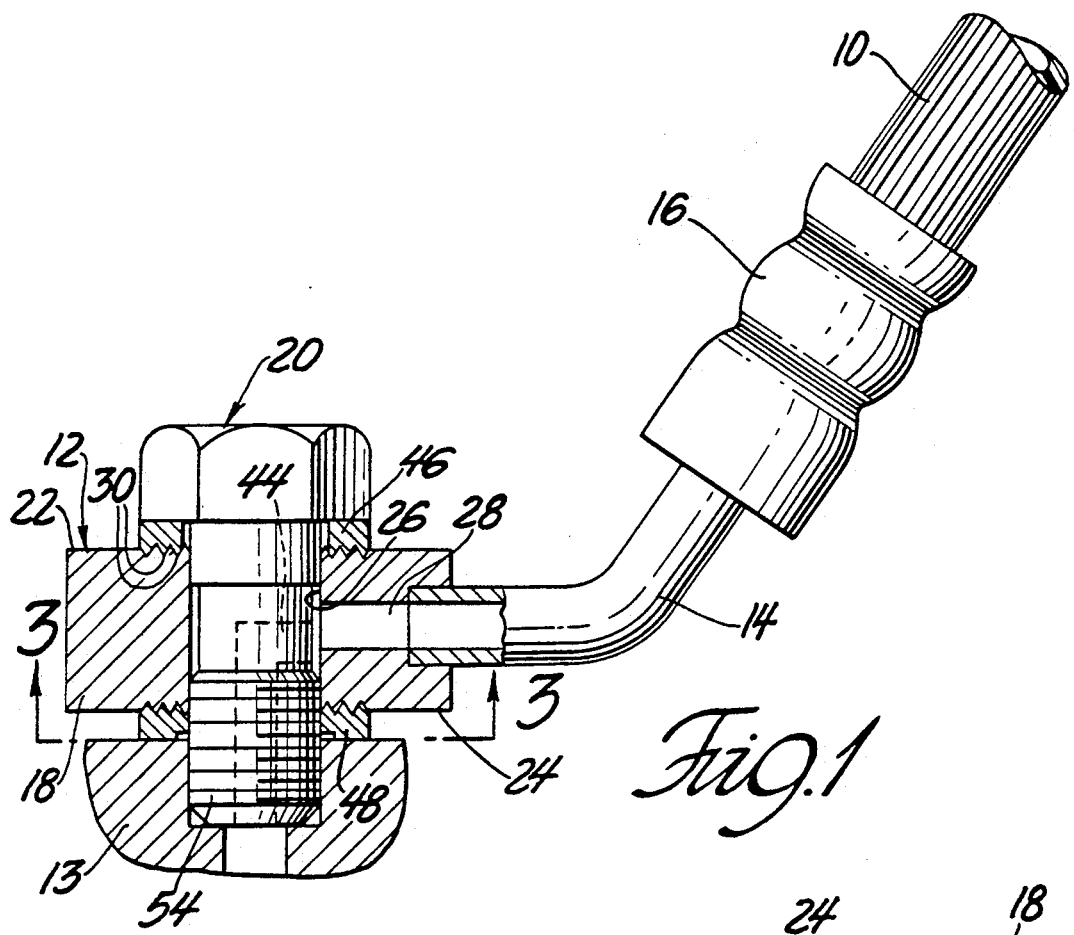
FIG. 1 is a partially sectioned view of the caliper end fitting.

The present invention is illustrated in the environment of a hydraulic system for transmitting fluid under pressure to a wheel mounted brake caliper. Fluid from the master brake cylinder is transmitted through a flexible reinforced conduit 10 to an end fitting 12 adapted to be suitably connected to a wheel mounted brake caliper 13. The end fitting includes a rigid conduit 14 suitably connected through a crimped or swaged fitting 16 to flexible conduit 10 and brazed to the end fitting 12.

A problem with such fitting is preventing leakage between the fitting housing 18 and its retaining bolt 20. The present invention is directed to improving the hydraulic sealing between such fitting and its retaining bolt.

The end fitting housing 18 as depicted is square, although it may be of any other suitable shape, and includes a pair of generally planar and parallel spaced faces 22 and 24. A cylindrical bore or chamber 26 extends through the housing and opens into the faces 22 and 24. A transverse passage 28 is formed through housing 18 and communicates at its innermost end with cylindrical chamber 26 and at its outer end communicates with rigid conduit 14. Two sets of circular V-shaped grooves 30 and 32 are respectively formed in housing faces 22 and 24 and are concentrically related to the cylindrical chamber 26. As will be seen from the subsequent description, the concentric grooves are part of the means for hydraulically sealing the end fitting.

Figure 4:
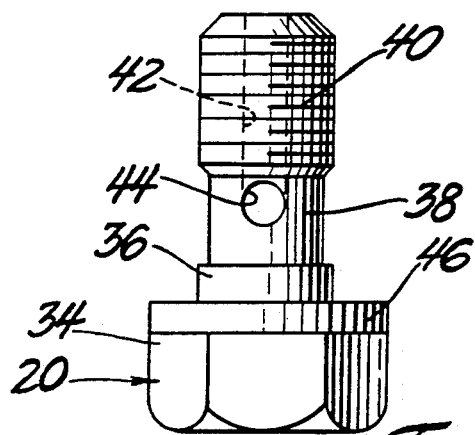
FIG. 4 is a view of the end fitting retaining bolt.
Figure 5:
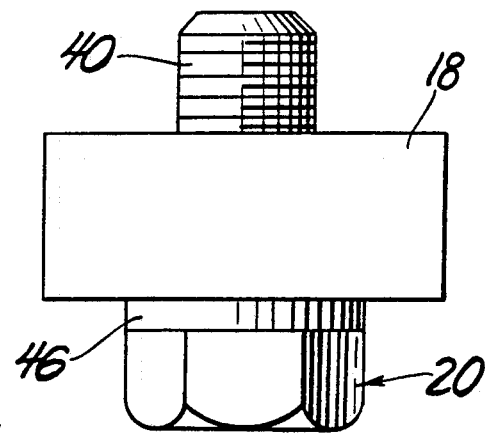
FIG. 5 is an elevational view of the end fitting housing with the bolt therein and without the bolt retaining washer.
Figure 6:
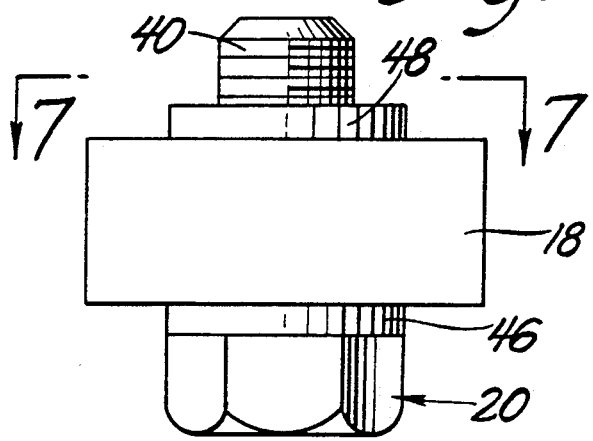
FIG. 6 is an elevational view of the fitting housing including the bolt retaining washer.

Referring particularly to FIGS. 1 and 4, the fitting retaining bolt 20 includes a head 34 and a shank 36. Shank 36 includes a circumferentially reduced portion 38 and a threaded end portion 40. An axial passage 42 is formed through the bolt shank and opens at the end of the shank remote from the bolt head and at its other end communicates with a transverse passage 44 which, in turn, communicates with the circumferentially reduced portion 38 of the bolt shank. Thus, fluid under pressure from the master cylinder is adapted to be transmitted through the flexible conduit or hose 10 to rigid conduit 14, through housing passage 26 and into the annular chamber defined by the circumferentially reduced portion 38 of the bolt shank and the cylindrical housing chamber 26. From this annular chamber the fluid under pressure is adapted to be transmitted through the bolt passages 42 and 44 to the brake caliper 13.

As part of the means for hydraulically sealing the end fitting, a first circular washer 46 is provided and is adapted to be concentrically disposed about the bolt shank intermediate the bolt head 34 and housing face 22. A second washer 48 is provided and is adapted to be disposed between the other face 24 of housing 18 and brake caliper 13. However, during the initial assembling and transporting of such a fitting and attached hoses and until the fitting is bolted to the caliper it has been the practice to utilize the outermost washer 48 to loosely retain the bolt to the fitting 12.

Figure 2:
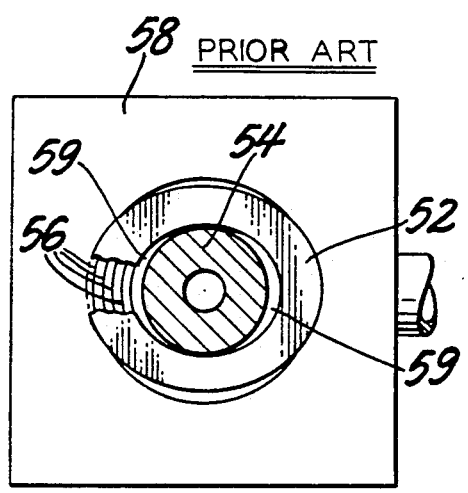
FIG. 2 represents a prior art bolt retaining washer.

Before the improvement of the present invention and as illustrated in FIG. 2, it has been the practice to crimp or ovalize an initially circular washer 52 so as to cause diametrically opposite portions of the crimped washer to interengage with the threaded portion 54 of the bolt shank. In thus ovalizing a sealing washer, there is created a non-symmetrical relationship between the washer and the coacting concentric sealing groves 56 in a fitting housing 58 which can lead to improper sealing and thus leakage between the fitting and the bolt.

More specifically, in ovalizing washer 52 gaps 59 are created which leave one or more of the radially innermost groove 56 uncovered and, therefore, unsealed by the washer. In other words, for optimal sealing action between the washer and the housing, the radially innermost sealing grooves should be circumferentially covered by the washer which only partially occurs when an ovalized or crimped washer is utilized.

Figure 3:
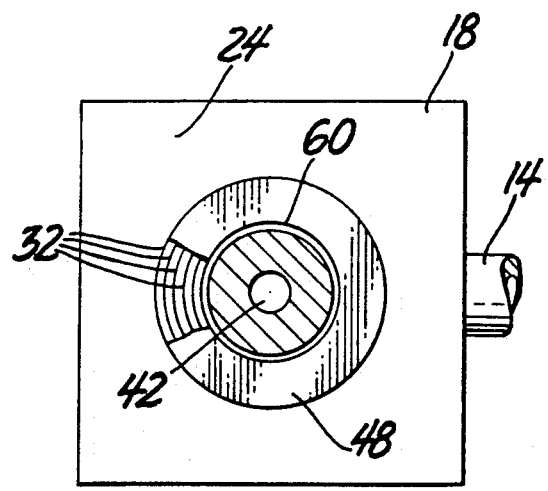
FIG. 3 is a view along line 3—3 of FIG. 1.
Figures 9, 10:
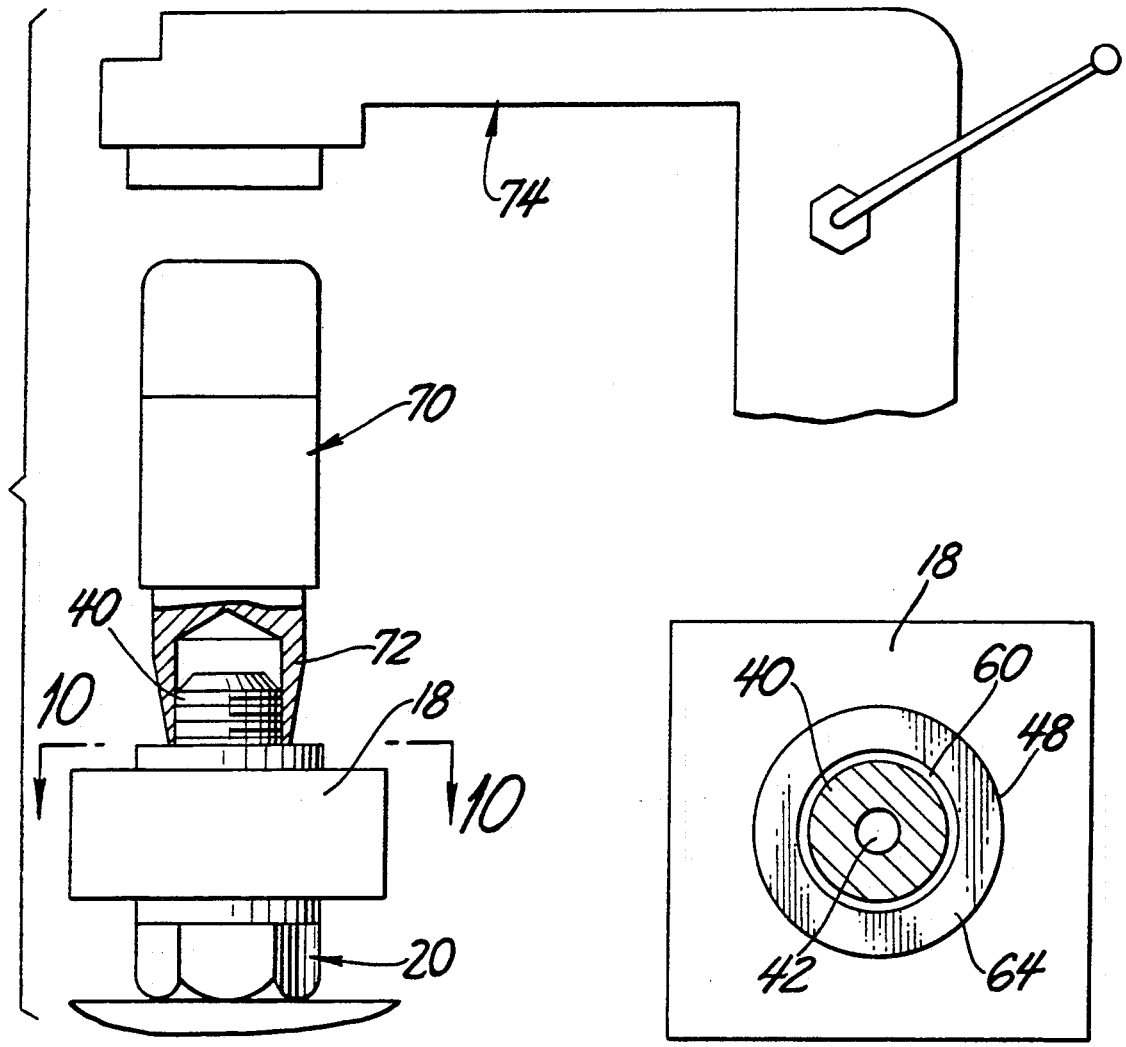
FIG. 10 a is a view along line 10—10 of FIG. 9.
Figure 11:
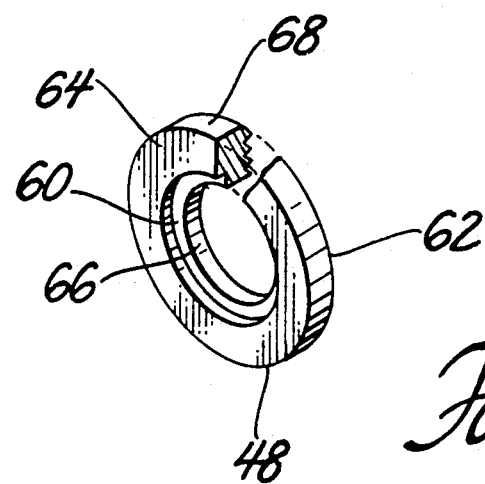
FIG. 11 is a partially sectioned perspective view of the bolt retaining washer as radially inwardly displaced.

The improvement of the subject invention is to maintain the circularity of both washers and particularly the inner washer 48. Instead of ovalizing or crimping the washer as done previously to interengage with the threaded portion 40 of bolt 20, a circular portion 60 of the washer 48 is radially displaced or deformed in a symmetrical and circular fashion to provide interengagement with the threaded portion 40 of the bolt shank. Washer 48 as symmetrically and radially inwardly deformed is illustrated in FIGS. 3, 10 and 11.

Figure 7:
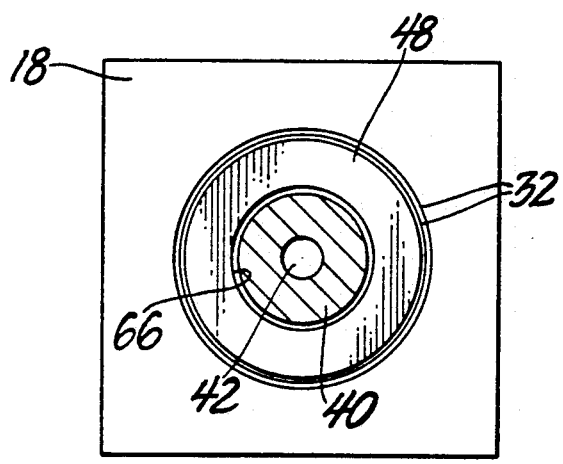
FIG. 7 is a view along line 7—7 of FIG. 6.
Figure 8:
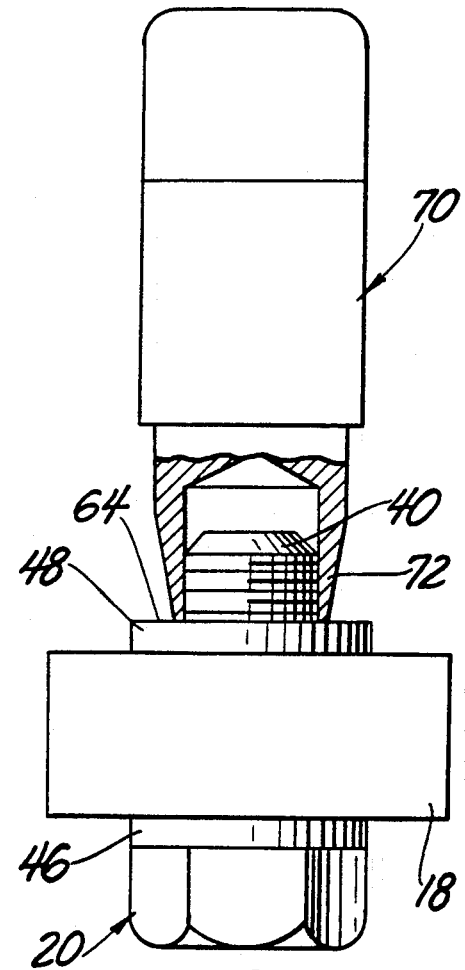
FIGS. 8 and 9 disclose tools for radially inwardly displacing a portion of the bolt retaining washer.

The manner in which this circular deformation occurs will now be described. To begin with, washer 48 includes a pair of parallel and spaced surfaces 62 and 64. The washer also includes concentric inner and outer circumferences 66 and 68. Referring to FIGS. 4–7, washer 46 is slipped over the bolt shank 36 and rests against the underside of bolt head 34. Next, the bolt and washer are inserted through the cylindrical opening 26 in housing 18 and following which pre-deformed washer 48 is slipped over the threaded portion 40 of bolt 20. At this stage, as seen in FIG. 7, the inner circumference 66 of washer 48 is slightly larger than the outside diameter of the threaded shank portion 40 of bolt 20. In order to symmetrically deform or displace the inner circumferential portion 60 of washer 48, reference should be made to the tooling illustrated in FIGS. 8 and 9. A coining or deforming tool is indicated generally at 70 and includes a hollow cylindrical portion 72 adapted to fit over the threaded end portion 40 of bolt 20 and the adjacent walls of which cylindrical portion are inwardly tapered toward the open end thereof to provide a relatively sharp end portion adapted to engage surface 64 of washer 48 in a symmetrical area adjacent the inner circumference of the washer. As illustrated in FIG. 9, the tool and end fitting are then placed beneath a press 74 which is adapted to impact or drive the tool so as to radially inwardly deform the inner circumferential area 60 of washer 48 causing that portion of the washer to be deformed and be displaced radially inwardly to interengage with the adjacent threaded portion of the bolt and, as seen in FIG. 10, and thereby retaining the bolt to the fitting housing 18 until such time as the bolt is threaded into caliper 13.

It is apparent that other modifications may be made within the intended scope of the invention as set forth in the hereinafter appended claims.

What is claimed is:

1. An end fitting assembly of the type including a housing having a pair of generally planar and parallel spaced faces, a cylindrical chamber extending through said housing and opening into said faces, a plurality of circular V-shape grooves formed in each of said faces and concentric with said chamber, a passage extending through said housing and having an inner end communicating with said chamber said passage having an outer end, a fluid supply conduit secured to said housing and communicating with the outer end of said housing passage, a bolt having a shank adapted to extend through said cylindrical chamber, said shank having a circumferentially reduced portion communicating with said housing passage, the end of said shank remote from the bolt head and extending from the reduced portion being threaded, an axial passage formed in said bolt shank and terminating at one end at the shank end opposite the bolt head, a transverse passage formed in said shank and communicating said axial passage with the circumferentially reduced shank portion, a first all metal washer disposed between the bolt head and one of said housing faces and overlaying the associated concentric grooves and a second all metal washer surrounding the threaded portion of the bolt shank and adapted to loosely retain the bolt to said housing proximate the other and adjacent face of said housing, the improvement comprising:

said second washer being circular and overlaying a plurality of said concentric housing grooves, a circular area proximate the inner circumference of the second washer being displaced radially inwardly to interengage with the threaded shank to retain said bolt to the housing.

2. An end fitting of the type set forth in claim 1 wherein the innermost grooves of the other and adjacent housing face are continuously overlaid by the radially displaced portion of said washer.

3. An end fitting of the type set forth in claim 2 wherein the inwardly displaced portion of the second washer surface is concentric with the cylindrical housing chamber.

4. An end fitting of the type set forth in claim 1 wherein the radially displaced circular area of said washer is circumferentially continuous.

5. An end fitting of the type set forth in claim 4 wherein the inner and outer circumferences of said second washer are concentric with the cylindrical housing chamber.

6. An end fitting of the type set forth in claim 1 wherein said second washer includes first and second parallel surfaces, the first washer surface of the second washer adapted to abut against said housing, said second washer having inner and outer circumferences, that portion of the second washer surface surrounding the inner circumference being radially inwardly displaced to interengage with the threaded shank to retain the bolt in said housing.

* * * * *